United States Patent
Kremer et al.

(10) Patent No.: US 9,949,139 B2
(45) Date of Patent: Apr. 17, 2018

(54) SYSTEM, METHOD, AND COMPUTER PROGRAM FOR CALCULATING A CUSTOMER VALUE FOR COMMUNICATION SERVICE PROVIDER CUSTOMERS FOR NETWORK OPTIMIZATION AND PLANNING

(71) Applicant: Amdocs Development Limited, Limassol (CY)

(72) Inventors: Nadav Kremer, Hadera (IL); Dori Ben-Moshe, Ramat HaSharon (IL); Yaron Shlomo Kadmon, Kfar Saba (IL); Ronen Kenig, Hod Hasharon (IL); Meir Oren Levy, Givat-Chen (IL)

(73) Assignee: Amdocs Development Limited, Limassol (CY)

( * ) Notice: Subject to any disclaimer, the term of this patent is extended or adjusted under 35 U.S.C. 154(b) by 0 days.

(21) Appl. No.: 15/335,323

(22) Filed: Oct. 26, 2016

(65) Prior Publication Data
US 2017/0127291 A1    May 4, 2017

Related U.S. Application Data

(60) Provisional application No. 62/248,227, filed on Oct. 29, 2015.

(51) Int. Cl.
*H04W 16/18* (2009.01)
*H04W 64/00* (2009.01)
(Continued)

(52) U.S. Cl.
CPC ........ *H04W 16/18* (2013.01); *G06Q 30/0201* (2013.01); *H04W 64/00* (2013.01); *H04W 16/20* (2013.01)

(58) Field of Classification Search
CPC ..... H04W 16/18; H04W 16/20; H04W 24/00; H04W 24/02; H04W 4/02; H04W 64/00;
(Continued)

(56) References Cited

U.S. PATENT DOCUMENTS 8,364,089 B2 * 1/2013 Phillips .............. G06Q 30/0282
455/423
8,775,645 B2 7/2014 Solotorevsky et al.
(Continued)

FOREIGN PATENT DOCUMENTS

EP          1209604 A2    5/2002

*Primary Examiner* — Olumide T Ajibade Akonai
(74) *Attorney, Agent, or Firm* — Zilka-Kotab, PC

(57) ABSTRACT

A system, method, and computer program product are provided for calculating a customer value for communication service provider customers for network optimization and planning. In use, at least one customer of a communication service provider (CSP) is identified. The customer is identified to calculate a current customer value of the customer to the communication service provider. Additionally, a current location of the customer is identified based on a determined current location of a user device being utilized by the customer. Further, information associated with a current service being utilized by the customer on the user device being utilized by the customer is identified. Moreover, the current customer value of the customer to the communication service provider is calculated based on at least the current location of the customer and the current service being utilized by the customer.

12 Claims, 5 Drawing Sheets

(51) Int. Cl.
*G06Q 30/02* (2012.01)
*H04W 16/20* (2009.01)

(58) Field of Classification Search
CPC ....... H04W 16/04; H04W 16/10; H04W 4/26;
H04L 41/08; H04L 41/0853; H04L 41/12;
H04L 41/5009; G06Q 30/0201
See application file for complete search history.

(56) References Cited

U.S. PATENT DOCUMENTS

| | | |
|---|---|---|
| 2002/0198751 A1 | 12/2002 | Ernest et al. |
| 2003/0120764 A1 | 6/2003 | Laye et al. |
| 2005/0228707 A1 | 10/2005 | Hendrickson |
| 2016/0135067 A1* | 5/2016 | Morad .................. H04M 15/41 455/423 |

* cited by examiner

US 9,949,139 B2

SYSTEM, METHOD, AND COMPUTER PROGRAM FOR CALCULATING A CUSTOMER VALUE FOR COMMUNICATION SERVICE PROVIDER CUSTOMERS FOR NETWORK OPTIMIZATION AND PLANNING

CLAIM OF PRIORITY

This application claims the benefit of U.S. Provisional Application No. 62/248,227, filed Oct. 29, 2015, the entire contents of which are incorporated herein by reference.

FIELD OF THE INVENTION

The present invention relates to networks, and more particularly to determining customer values for users of such networks.

BACKGROUND

To date, most network decisions of communication service providers (CSPs), with respect to optimization, bandwidth allocation, congestion management, traffic shaping, capital expenditure (CAPEX) investment, and various predictions, are mainly based on network parameters (e.g. congestion indicators, performance metrics, faults, availability, etc.).

Customer experience has become one of the major metrics through which CSPs can differentiate themselves, and thus it has become increasingly important to consider the customer when making network decisions. These decisions may be from the real time area (i.e. in cell traffic prioritization), as well as for long term investment plans (e.g. determining where to deploy the next small cell or WiFi device, etc.). However, currently, customer value is not considered when making network planning and optimization decisions. Moreover, customer value is currently a fixed value, which does not allow the flexibility to adequately use such value in the context of network planning and optimization decisions.

There is thus a need for addressing these and/or other issues associated with the prior art.

SUMMARY

A system, method, and computer program product are provided for calculating a customer value for communication service provider customers for network optimization and planning. In use, at least one customer of a communication service provider (CSP) is identified. The customer is identified to calculate a current customer value of the customer to the communication service provider. Additionally, a current location of the customer is identified based on a determined current location of a user device being utilized by the customer. Further, information associated with a current service being utilized by the customer on the user device being utilized by the customer is identified. Moreover, the current customer value of the customer to the communication service provider is calculated based on at least the current location of the customer and the current service being utilized by the customer.

DETAILED DESCRIPTION

Figure 1:
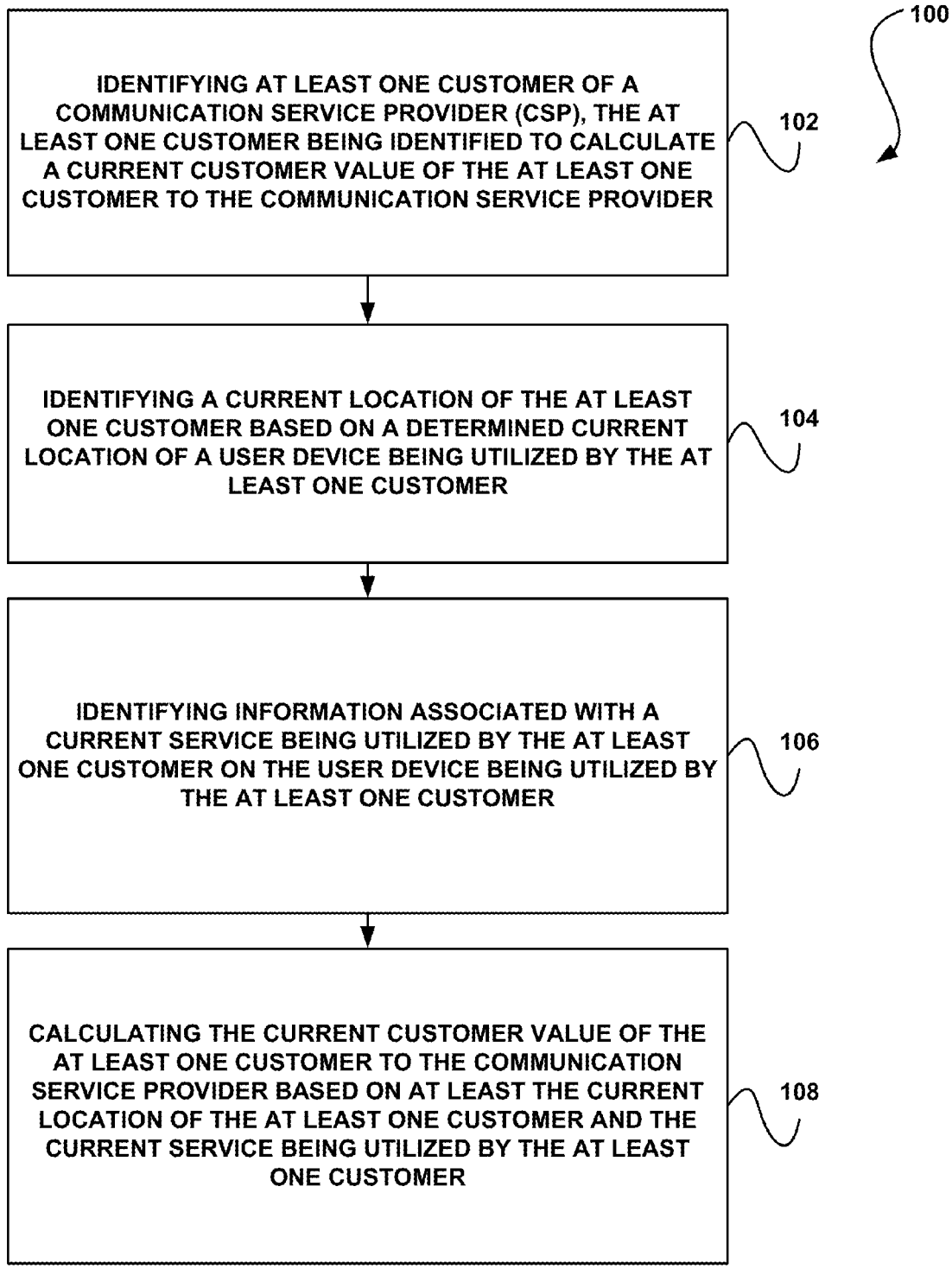
FIG. 1 illustrates a method for calculating a customer value for communication service provider customers for network optimization and planning, in accordance with one embodiment.

FIG. 1 illustrates a method 100 for calculating a customer value for communication service provider customers for network optimization and planning, in accordance with one embodiment.

As shown, at least one customer of a communication service provider (CSP) is identified by a system (e.g. a CSP system, etc.). See operation 102. The customer is identified to calculate a current customer value of the customer to the communication service provider.

Additionally, a current location of the customer is identified by the system based on a determined current location of a user device being utilized by the customer. See operation 104. For example, the customer may be accessing one or more networks associated with the communication service provider utilizing one or more user devices.

The user devices may include devices such as mobile phones, tablet computers, laptop computers, smart phones, and/or any other type of mobile device. The network may include various cellular and/or WiFi networks, etc. The location may be a sector, ECGI, or a site associated with the communication service provider. The location may be determined based on GPS coordinates of the user device, the network being used, triangulation, or using various other techniques.

Further, information associated with a current service being utilized by the customer on the user device is identified by the system. See operation 106. The information associated with the current service may include, for example, the type of service being utilized (e.g. data, voice, etc.), a type of application being utilized, an amount of bandwidth being utilized, and/or various other types of information.

Moreover, the current customer value of the customer to the communication service provider is calculated by the system based on at least the current location of the customer and the current service being utilized by the customer. See operation 108. In various embodiments, additionally parameters and information may be utilized to base the customer value, which are described in the context of FIG. 2 below.

Thus, the calculated customer value is not a fixed value, but rather a value calculated based on a current location and type of usage (i.e. a non-static value). Accordingly, a customer who consumes a service from location A has a value to the CSP, which may be different than the value of the same customer when consuming a service from location B. The customer value may be a monetary value or a value that is referenced based (e.g. a value based on a scale, etc.).

The calculated customer value may be used as part of a network planning calculation and/or a network optimization calculation. For example, the method 100 may include calculating the current customer value for each of a plurality of customers at the current location. The calculated current customer value for each of the plurality of customers may be utilized to determine a customer value for the current location. The customer value for the current location may be utilized for long term network planning and/or for network optimization.

Thus, the method 100 may be utilized to generate a customer value that is associated with subscriber digital behavior, as reflected from the network, as opposed to a more traditional net present value calculation. In addition, the method 100 distinguishes between computing customer value for the purpose of "on demand" and low latency network decisions, versus customer value for long term network planning. Customer value for long term network planning includes more complex calculations, such as predicting subscriber future consumption in a specific location.

It should be noted that the method 100 may be implemented utilizing various systems, hardware (e.g. processors, etc.), software, applications, user interfaces, etc., as dictated by the implementer. For example, in one embodiment, the steps of the method 100 may be implemented by a CSP system (e.g. including one or more computing devices, processors, databases, etc.). More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Customer value can mean different things to different people and organizations, and there have been various ways to calculate customer value in the past. For example, customer value has been calculated in a naive way, based on the monthly payment that subscribers pay to CSPs. Additionally, customer value has been calculated in a common way where the expected revenues are assumed from the subscriber. Further, customer value has been calculated in a more sophisticated way, based on customer Life Time Value (LTV).

Customer LTV, which is the most used approach to date, is based on two integrated statistical models: 1) calculating the projected revenues that can be received from the subscriber using net present value; and 2) calculating the probability of the subscriber to churn.

The integrated model creates the LTV and it is widely used in the telco and non-telco industries. While LTV is a sophisticated way to calculate the value of the customer to the CSP, it does have its limitations however, mainly around the fact that it ends up with a fixed number that does not change and does not take into account customer location at various times, the usage type each time, and the amount of bandwidth that the customer consumes in those locations.

As the majority of the bandwidth a typical customer consumes comes from specific locations, there is a growing importance for CSPs to further differentiate themselves by understanding their customers' value in different locations.

Figure 2:
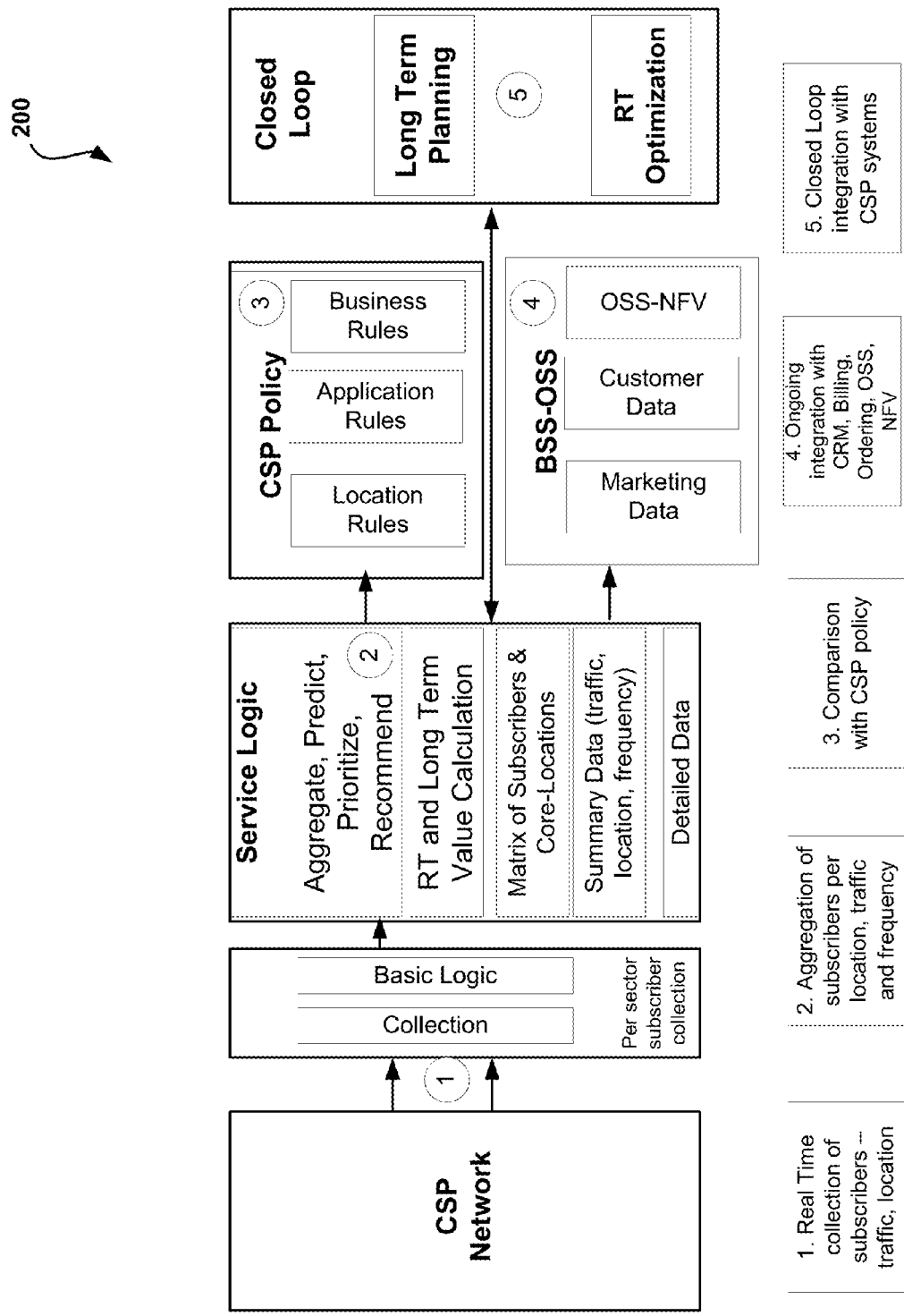
FIG. 2 illustrates a system for calculating a customer value for communication service provider customers for network optimization and planning, in accordance with one embodiment.

FIG. 2 illustrates a system 200 for calculating a customer value for communication service provider customers for network optimization and planning, in accordance with one embodiment. As an option, the system 200 may be implemented in the context of the details of FIG. 1. Of course, however, the system 200 may be implemented in the context of any desired environment. Further, the aforementioned definitions may equally apply to the description below.

The system 200 implements a new method and a new approach to calculate the value of a customer to a CSP. The customer value calculation is more tailored to network decisions and, as such, may be part of network optimization and planning.

The system 200 employs a new concept where a customer value is no longer a fixed number but rather a moving target that may mainly be based on the location of the customer. This means that a customer who consumes a service from location A has a value to the CSP, which may be different than the value of the same customer when consuming service from location B.

The main reason for the different values is that most customers have core locations from which they consume the service (e.g. data, video, voice, etc.). If the customers experience service problems from those locations, it creates more damage to the CSP than a random location that the customer has recently visited.

Therefore, most customers have different values to the CSP based on their most used location, application usage, and the amount of bandwidth they consume in each location.

The new model implemented by the system 200 creates another layer of personalization and differentiation to CSPs as they plan their customer experience strategy, as well as their ongoing network planning and optimization.

The system 200 distinguishes between customer value for the purpose of on-demand and low-latency network decisions versus customer value for long term network planning. Customer value for long term network planning includes more complex calculations, such as predicting subscriber future consumption in a specific location.

In various embodiments, the customer value may be generated utilizing various parameters. For example, the customer value may be generated utilizing location information, such as information about the sector(s) from which the customer consumes the service. Some locations may be more strategic to the CSP. As another example, the customer value may be generated based on a number of times a week the customer consumes a service from a particular location.

As another example, the customer value may be generated based on the average bandwidth consumption per location visit (e.g. how many megabytes the customer consumes every time the customer arrives at a location, such as home, work, a coffee shop, a friend's house, family location, etc.). Additional examples of criteria that may be used to base the customer value calculation may include an average price per gigabyte (P), an average number of years subscribers stay with the CSP (T), customer type (VIP, Corporate, Household), churn alert (Y/N), the type of content the customer consumes at a certain location (e.g. video—what kind, data—which sites, etc.), how close the customer is to consume a data plan (e.g. the customer has a 7 GB package, how close the current consumption status is to this number, etc.), a product type (e.g. the kind of product/data plan the subscriber has, etc.), age of the subscriber, whether the customer is part of a packaged price following a marketing campaign, a segment type associated with the customer (e.g. assuming there is segmentation, to which segment does the customer belong), the average cost of acquiring new customers, and/or various other criteria. Of course, any of this information/criteria may be used individually or in combination to base or generate the current customer value. Additionally, the criteria/information utilized to base the customer value may be weighted in various ways.

For the purpose of network decisions, some parameters may be more essential than others.

As previously noted, the traditional way of calculating customer value is to build a model of monthly revenues over time and implement net present value analysis on it. In addition, another model might be added in order to come up with the probability of the customer to churn over that time. The combination of these results is a financial oriented customer value model that is widely used in many industries, including the telecom industry. The system 200 implements a much simpler model as well as a model that is more network oriented, taking into account, for example, location, usage, and consumed bandwidth to generate the customer value.

In one embodiment, the system 200 may utilize core parameters for building a model for both real time network decisions as well as for long term network planning decisions. These core parameters may include, for example, location (e.g. sector/ECGI, etc.), average MB usage of a customer per location visit, a number of times a week a customer visits the location (e.g. a sector/ECGI, etc.), an average number of years a customer stays with the CSP (e.g. dictated by the CSP), and/or an average cost per GB usage. Additional parameters that may be optional for the calculation include a customer type (e.g. VIP, Corporate, Household, etc.), a customer usage distribution (e.g. video, data, etc.), and/or churn alert (Y/N), etc.

For long term network planning, there may be prediction figures that are part of the calculation, such as predicting customer usage per location (e.g. 3, 6, 12 months from today, etc.), and predicting sector/location growth in general.

With respect to calculating customer value for real time network optimization, the essence of real time network decisions is a closed loop. Whatever the scenario is (e.g. sector congestion, sector prioritization, and special events, etc.), the flow may be completed upon a closed loop activity back to the network.

Therefore, the goal is to come up with a simple and straight forward approach that is consistent across all locations. As long as the calculation is consistent across all customers, then the target of adding customer value to network decisions is achieved.

In addition, customer value may change per location based on the number of times the customer visits the location and the amount and type of bandwidth the customer consumes in that location. Finally, the input for the calculation should be network and customer related parameters.

Table 1 shows an example for input parameters per location to be used in a new model.

TABLE 1

($S_i$) - average number of MB the subscriber consumes in location i every time the customer visits the location i
($C_i$) - number of times the subscriber visits location i every week.
($A_i$) = ($S_i$) × ($C_i$) = the number of MG subscriber consumes in location i every week
T - Average number of years a subscriber stays with the CSP (dictated by the CSP)
P - Price per GB (in USD, dictated by the CSP)
Customer Value per location i = 52 × $A_i$ × T × P/1000 (in USD)

Assuming that all locations are equally important, then the average customer value per CSP network is: Customer Value=SUM (Customer Value of all locations)/number of locations.

As an option, once the customer value has been established, a CSP may decide to add additional factors to the result (e.g. 20% more USD value, etc.), for a variety of reasons, such as the customer is a VIP, corporate partner, part of a family, etc.

As an example, customer value in location i may be 100 USD. However, because the customer is part of a corporation, the value may become 100×1.2=120 USD (i.e. 20% more value due to the corporate affiliation). Location may be a sector, ECGI or a site.

For the long term, there is no need to close the loop, but rather prepare the right data for ongoing decisions, such as a CAPEX investment plan per location, a determination of what type of investment (e.g. Small Cell versus WiFi, etc.), predicting customer behavior, etc.

The value of the customer for the long term may be derived from the amount of bandwidth the customer consumes in a location, while predicting the future amount (this analysis requires Big Data Analysis techniques).

For long term calculations, the customer value is always associated with a location(s), as all future planning is location based.

This new approach of determining a dynamic current customer value will aid CSPs in overcoming various challenges, such as, for example: the on-going move from making network-centric QoS decisions towards subscriber centric QoE based decisions; the highly dynamic changes on the demand of network capacity over time and geography; the technological jumps with the introduction of Network Function Virtualization (NFV) and Software Defined Networking (SDN); the further need for personalization across all services; and the need to have one language across all CSP divisions when looking at making E2E prioritization decisions.

The current approaches to customer value calculation are mainly based on financial modeling and they neglect the actual services subscribers consume as well as the various locations from which the service is consumed. The current approaches do not distinguish between subscriber value for the short term (e.g. network optimization decisions, etc.) and subscriber value for the long term (e.g. prioritization with regards to when and where to deploy the next small cell, etc.).

Utilizing the techniques described herein for calculating subscriber value, subscriber value is no longer a fixed number, but rather a moving target that is fundamentally based on location but can be extended to include subscriber usage type and time of day, etc. Additionally, every subscriber has one location through which the subscriber consumes most of the services and bandwidth (e.g. work, home, coffee shop, etc.), called a Subscriber Core Location. In that location the subscriber is extremely sensitive to quality of service. This may be considered when customer value is calculated. Further, subscriber value for RT network optimization decisions is not equal to subscriber value for long term decisions and planning. Thus, many CSP applications (e.g. Call Centers, Campaigns, Planning, Analytics, Billing, etc.) are capable of adopting this approach as part of internal decision making.

The customer value calculation described herein will help improve CSP decisions in a variety of situations. For example, a subscriber may call a call center complaining about a poor video. If the location is the core-location of the subscriber, then the problem may be immediately escalated and may receive the highest priority. As another example, in the context of introducing a new data/video service, a CSP can start with the geographical area that has the most core locations with similar services, then gradually, based on the same priority, move to other areas.

As another example, to improve a CSP "Employee Engagement Program", the plan may be applied for specific employees for specific locations and subscriber satisfaction whose core location matches the employee engagement plan may be measured as a vehicle for employee bonuses and the success of the program as a whole. Additionally, all network RT decisions (low latency) as well as long term (with prediction) may use subscriber value for prioritization.

Thus, the improvements over the traditional way of network optimization includes that, for the first time, business decisions, and mainly, determining the customers that are related to a network optimization action, become part of the parameters for the decision itself.

In addition, customer value is no longer a fixed number. It is a moving target that changes based on location, time, application usage, and bandwidth consumption, etc. This by itself creates great flexibilities for CSPs to come up with unique business policies for better network optimization and ultimately better network monetization.

Additionally, many applications for real time, such as in-cell optimization, customer value driven SON, next best investment, predictive SON, could use this new technique for calculating customer value, which will generate superior results to using the traditional approaches for customer value.

The current dynamic subscriber value calculation may be utilized in various areas of a CSP organization, such as in BSS (Billing, CRM, Ordering, etc.), big data analytics, OSS, and NFV, etc.

For example, in the context of a campaign on pricing, a CSP may offer a subscriber an additional discount for the bandwidth the subscriber consumes from their core location. Eventually, the subscriber will finish their data plan quicker and upgrade to a more expensive package. A core-location calculation may also be utilized for determining best locations for new investments (e.g. a new way to rank the cells).

Figure 3:
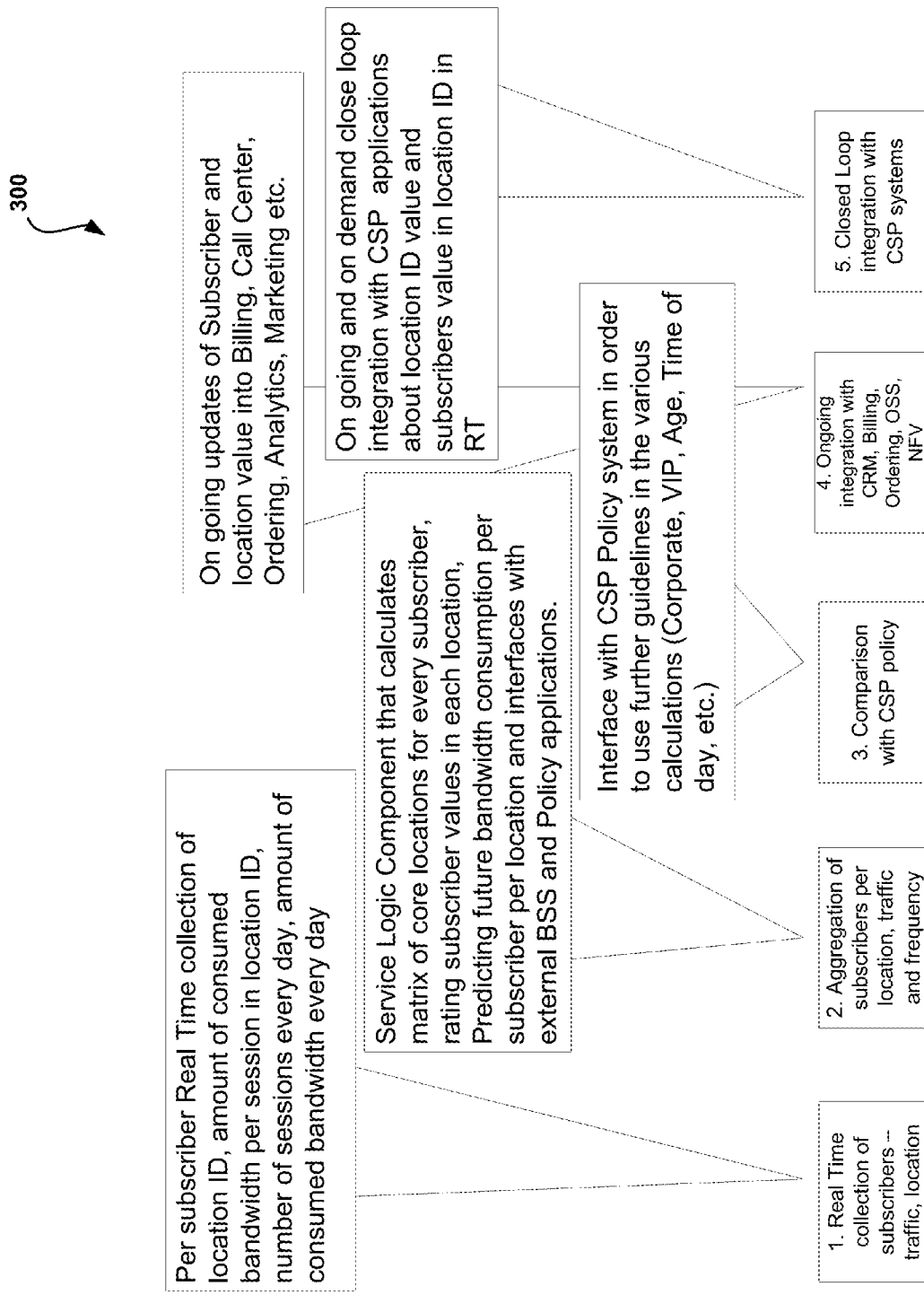
FIG. 3 illustrates a system flow diagram of a system for calculating a customer value for communication service provider customers for network optimization and planning, in accordance with one embodiment.

FIG. 3 illustrates a system flow diagram 300 of a system for calculating a customer value for communication service provider customers for network optimization and planning, in accordance with one embodiment. As an option, the diagram 300 may be implemented in the context of the details of the previous figures. Of course, however, the diagram 300 may be implemented in the context of any desired environment. Further, the aforementioned definitions may equally apply to the description below.

As shown, a CSP system performs real time collection of subscriber data, including traffic, location, etc. This includes per subscriber real time collection of location ID, amount of consumed bandwidth per session associated with the location ID, the number of sessions every day, and the amount of consumed bandwidth every day, etc.

The CSP system performs an aggregation of subscriber data per location, traffic, and frequency. This includes utilizing a Service Logic Component that calculates a matrix of core locations for every subscriber, rating subscriber values in each location, predicting future bandwidth consumption per subscriber per location and that interfaces with external BSS and policy applications.

The CSP system performs a comparison with an associated CSP policy. This includes interfacing with a CSP policy system in order to use further guidelines in the various calculations (e.g. Corporate, VIP, Age, Time of day, etc.).

The CSP system performs ongoing integration with systems associated with CRM, Billing, Ordering, OSS, and NFV (Network Function Virtualization), etc.

The CSP system ensures closed loop integration with all relevant CSP systems. This includes ongoing and on demand closed loop integration with CSP applications about location ID value and subscribers' value associated with a particular location ID in real time.

Figure 4:
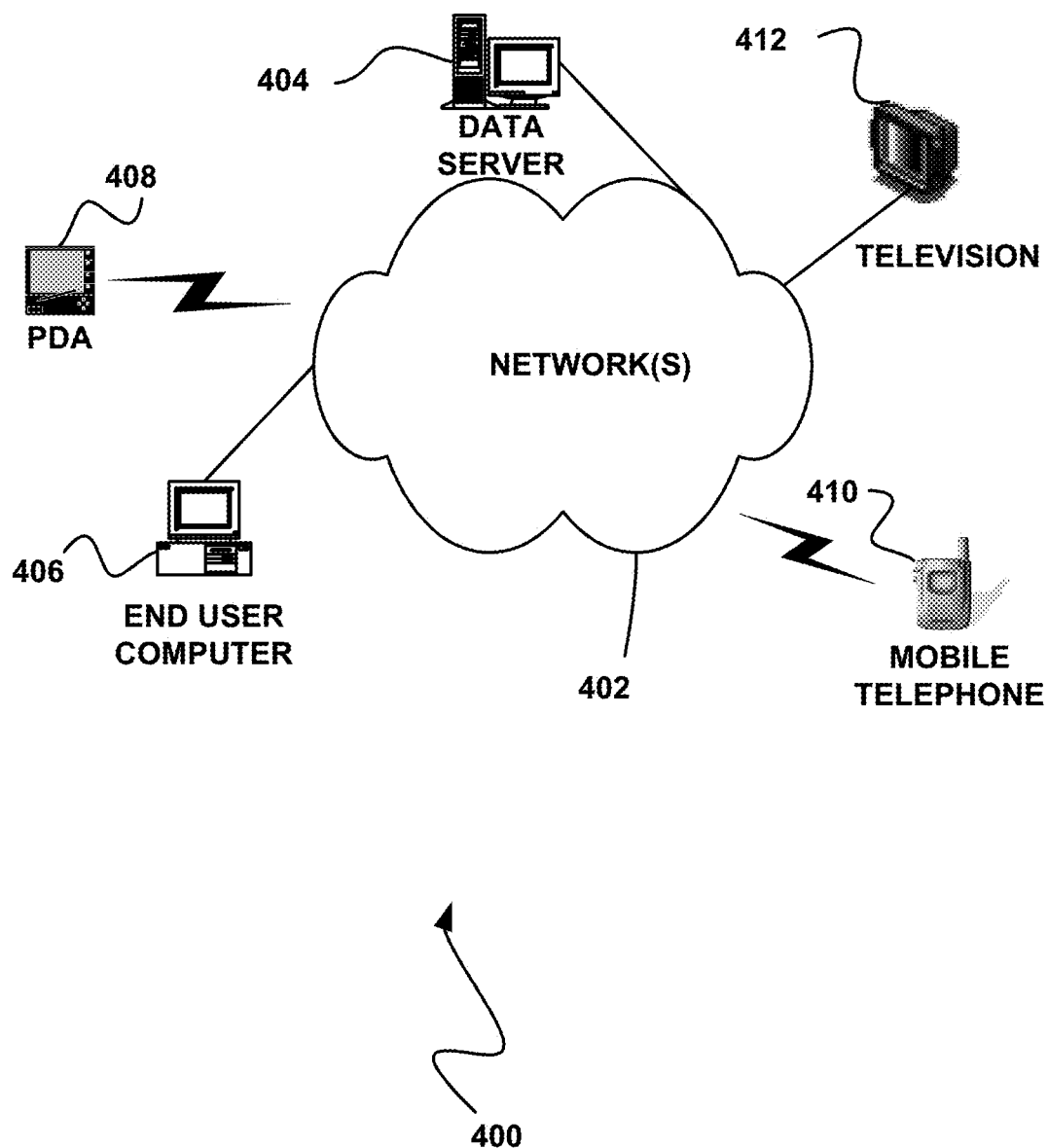
FIG. 4 illustrates a network architecture, in accordance with one possible embodiment.

FIG. 4 illustrates a network architecture 400, in accordance with one possible embodiment. As shown, at least one network 402 is provided. In the context of the present network architecture 400, the network 402 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 402 may be provided.

Coupled to the network 402 is a plurality of devices. For example, a server computer 404 and an end user computer 406 may be coupled to the network 402 for communication purposes. Such end user computer 406 may include a desktop computer, lap-top computer, and/or any other type of logic. Still yet, various other devices may be coupled to the network 402 including a personal digital assistant (PDA) device 408, a mobile phone device 410, a television 412, etc.

Figure 5:
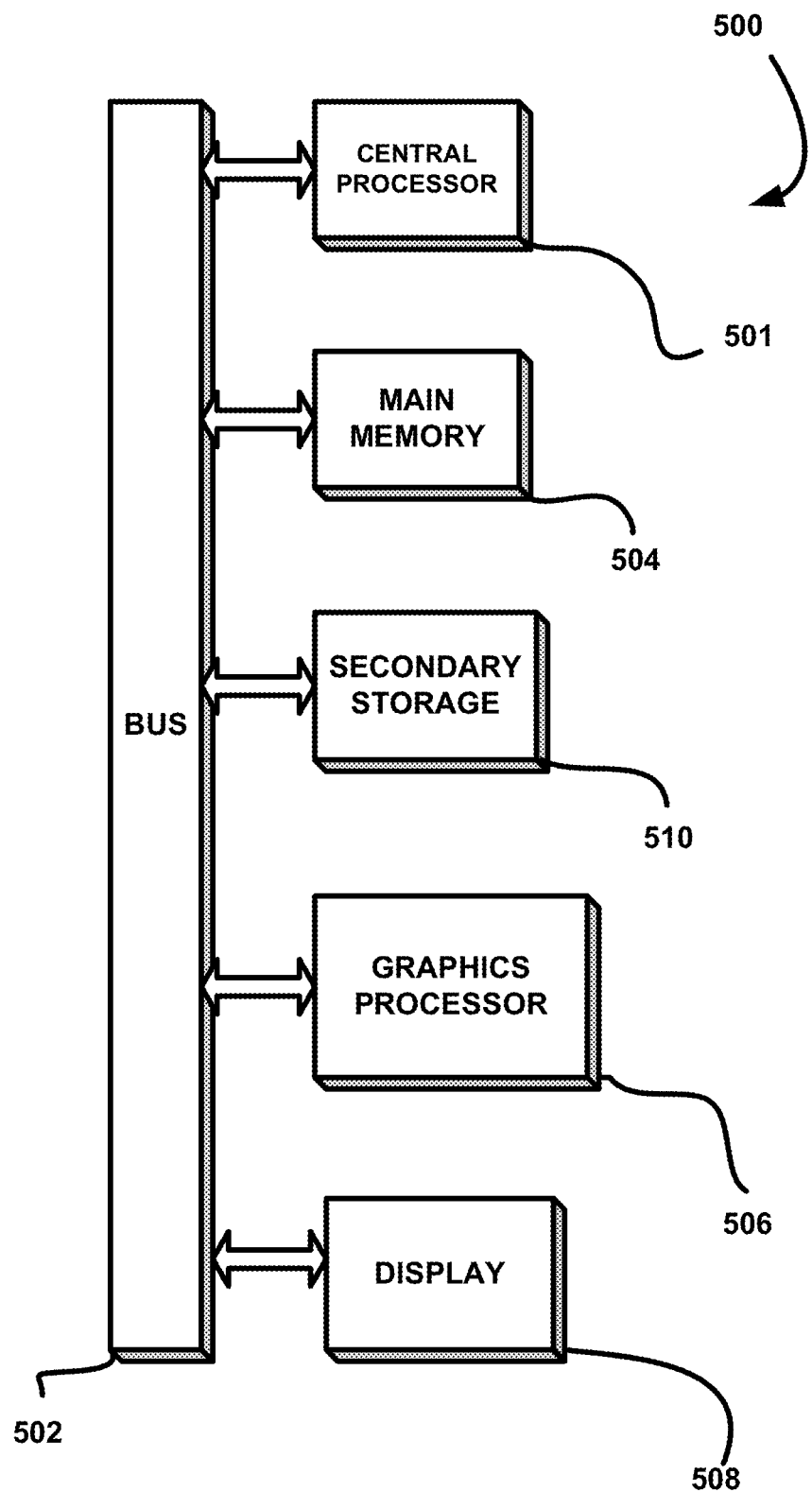
FIG. 5 illustrates an exemplary system, in accordance with one embodiment.

FIG. 5 illustrates an exemplary system 500, in accordance with one embodiment. As an option, the system 500 may be implemented in the context of any of the devices of the network architecture 400 of FIG. 4. Of course, the system 500 may be implemented in any desired environment.

As shown, a system 500 is provided including at least one central processor 501 which is connected to a communication bus 502. The system 500 also includes main memory 504 [e.g. random access memory (RAM), etc.]. The system 500 also includes a graphics processor 506 and a display 508.

The system 500 may also include a secondary storage 510. The secondary storage 510 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 504, the secondary storage 510, and/or any other memory, for that matter. Such computer programs, when executed, enable the system 500 to perform various functions (as set forth above, for example). Memory 504, storage 510 and/or any other storage are possible examples of tangible computer-readable media.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A method, comprising:
   identifying, by the system, a plurality of customers of a communication service provider (CSP), the plurality of customers being identified to calculate a current customer value of each customer of the plurality of customers to the communication service provider;
   for each customer of the plurality of customers:
      identifying, by the system, a current location of the customer based on a determined current location of a user device being utilized by the customer,
      identifying, by the system, information associated with a current service being utilized by the customer on the user device being utilized by the customer, and
      calculating, by the system, the current customer value of the customer to the communication service provider based on at least the current location of the customer and the current service being utilized by the customer,
      wherein the current customer value of the customer changes over time in relation to changing locations of the customer over time, and
      wherein the current customer value is higher when the current location of the customer is a core location for the customer that is a location most used by the customer, than when the current location of the customer is not the core location for the customer;
   rating, by the system, the current customer values in each of a plurality of locations; and
   performing, by the system, location-based long term network planning based on results of the rating, including:

determining, by the system based on the results of the rating, which location of the plurality of locations in which to deploy a new network device.

2. The method of claim 1, wherein the information associated with the current service includes a type of service being utilized.

3. The method of claim 1, wherein the information associated with the current service includes an amount of bandwidth being utilized.

4. The method of claim 1, wherein the user device includes a mobile phone.

5. The method of claim 1, wherein the user device includes a computer.

6. The method of claim 1, wherein the long term network planning includes a decision on when and where to deploy a new cell within a network.

7. The method of claim 1, wherein the current customer value is not equal to another customer value determined for network optimization decisions.

8. The method of claim 1, further comprising:
   receiving a complaint from a customer of the at least one customer about a service;
   determining that a location of the customer is the location most used by the customer;
   in response to determining that the location of the customer is the location most used by the customer, assigning a highest priority to the complaint.

9. The method of claim 1, further comprising:
   identifying a new service to be introduced by the communication service provider;
   determining a geographical area that has the most core locations for the plurality of customers with similar services being utilized by the plurality of customers; and
   introducing the new service in the determined geographical area.

10. A computer program product embodied on a non-transitory computer readable medium, comprising computer code for:
    identifying, by a system, a plurality of customers of a communication service provider (CSP), the plurality of customers being identified to calculate a current customer value of each customer of the plurality of customers to the communication service provider;
    for each customer of the plurality of customers:
        identifying, by the system, a current location of the customer based on a determined current location of a user device being utilized by the customer,
        identifying, by the system, information associated with a current service being utilized by the customer on the user device being utilized by the customer, and
        calculating, by the system, the current customer value of the customer to the communication service provider based on at least the current location of the customer and the current service being utilized by the customer,
        wherein the current customer value of the customer changes over time in relation to changing locations of the customer over time, and
        wherein the current customer value is higher when the current location of the customer is a core location for the customer that is a location most used by the customer, than when the current location of the customer is not the core location for the customer;
    rating, by the system, the current customer values in each of a plurality of locations; and
    performing, by the system, location-based long term network planning based on results of the rating, including:
        determining, by the system based on the results of the rating, which location of the plurality of locations in which to deploy a new network device.

11. The computer program product of claim 10, wherein the information associated with the current service includes a type of service being utilized.

12. A system, comprising:
    one or more hardware processors for:
    identifying, by the system, a plurality of customers of a communication service provider (CSP), the plurality of customers being identified to calculate a current customer value of each customer of the plurality of customers to the communication service provider;
    for each customer of the plurality of customers:
        identifying, by the system, a current location of the customer based on a determined current location of a user device being utilized by the customer,
        identifying, by the system, information associated with a current service being utilized by the customer on the user device being utilized by the customer, and
        calculating, by the system, the current customer value of the customer to the communication service provider based on at least the current location of the customer and the current service being utilized by the customer,
        wherein the current customer value of the customer changes over time in relation to changing locations of the customer over time, and
        wherein the current customer value is higher when the current location of the customer is a core location for the customer that is a location most used by the customer, than when the current location of the customer is not the core location for the customer;
    rating, by the system, the current customer values in each of a plurality of locations; and
    performing, by the system, location-based long term network planning based on results of the rating, including:
        determining, by the system based on the results of the rating, which location of the plurality of locations in which to deploy a new network device.

* * * * *